3,083,132
PROCESS OF PREPARING TRANSPARENCIES
Walter F. Miehle, Seymour, Conn., assignor to Seal, Incorporated, a corporation of Connecticut
No Drawing. Filed Dec. 22, 1958, Ser. No. 781,864
3 Claims. (Cl. 156—234)

This invention relates to a process of preparing transparencies for exhibition purposes particularly by projection on a screen in a school room or theatre. By use of this process a transparency may be prepared from a printed page or picture or even from a sketch or drawing if drawn with an ink or pencil of such character that an impression may be taken therefrom. The process is particularly useful in audiovisual educational work where it is frequently desired to project a page or picture from a magazine or the like for exhibition before a class.

It is an object of the invention to provide a very simple method by which a reproduction may be obtained on a transparent film as free as possible from cloudiness, specks, bubble holes or other defects and to do this without the use of liquid gums or of any procedures difficult to perform or likely to result in failures. This object is attained by the present invention by the use of a transparent base film of adequate strength to be handled and used in a projector and which carries a thermoplastic layer which may be rendered adhesive at temperatures below those at which the base film would be softened or damaged. The film with the thermoplastic layer is pressed against the page or picture of which the transparency is to be made and heated until the ink has become attached to the hot thermoplastic layer. Upon cooling, the paper of the original page may be removed and a perfect transparency produced.

Various base films and thermoplastic layers may be employed but as an example of materials and procedures which I have found very satisfactory the following may be cited.

A base film of cellulose acetate (or nitrate) such as is ordinarily employed in photography is used. Other transparent materials such as cellophane, "Mylar," etc., could be used. This base film carries a thin thermoplastic layer of a suitable nature such as polyethylene. Other examples are poly-vinyl acetates modified with suitable plasticizers, poly-vinyl chlorides also modified with a suitable plasticizer, poly-propylene materials. Other materials having similar physical characteristics can be used.

A plastic coated film of this nature is dry and non-tacky at room temperatures and may be procured from the factory in finished condition and ready to use without any pre-treatment. The page or picture from which the transparency is to be made is preferably printed by letterpress on coated paper such as the clay coated papers used in many popular magazines in which case it does not require any treatment but is merely pressed against the coated film for a sufficient time and at a proper temperature to permit the ink to become adhered to the thermoplastic coating.

It is important that the thermoplastic coating or layer be of such a character that it will remain on the base film after the heat treatment so that it will retain the ink from the paper and will not detach itself from the base or become offset on the paper which would defeat the object of the invention. The materials above named possess this property while some other heat sealing coatings do not. The materials mentioned may be formed into a coherent film which is cemented or welded or laminated to the base film in ways well-known in the industry.

As a specific example of the practice of the invention a laminated film of cellulose acetate having a thin layer of polyethylene, for example 0.001" thick fixed thereto is used. This is placed in a press with the printed page which may be in black and white or colors in contact with the polyethylene coated side of the base film. Sufficient pressure is applied to hold the surfaces firmly in contact. The film is then heated to a temperature of about 225 degrees F. and this temperature maintained for about five minutes, more or less. The film with the printed page is then immersed in a bath of water to which a little wetting agent has preferably been added. As soon as the paper has become soft, it may be removed, leaving a clear impression of the picture in its original colors or printing on the polyethylene surface. As this returns to its original non-tacky condition as soon as it cools, a perfect transparency is produced. If flakes of paper remain on the film these may be easily wiped off when wet. After removal of the paper the surface of the film may if necessary be smoothed and rendered more transparent by wiping with a transparent waxy or oily material such as petroleum jelly or may be sprayed with a substance which will form a very thin transparent coating such for instance as "Krylon" or other plastic spray or lacquer.

The heat and pressure used in the process may be applied in any suitable manner. A very convenient way is to use an electrically heated dry mounting press such as shown in U.S. Patent to Krueger No. 2,644,151. A useful procedure is to place the film and paper between two thin smooth metal plates such as ferrotype squeegee plates, a thin layer of felt ($\frac{1}{16}$" for instance) being preferably placed between the underside of the paper sheet and the bottom plate. This assembly is then clamped up in the press and the necessary heat applied to cause the ink to adhere to the polyethylene coating.

I claim:

1. The process of producing transparencies from pictures or matter printed on paper which comprises providing a transparent base film of sufficient strength and stability and permanent characteristics to be readily handled and filed, having laminated therewith a transparent thermoplastic film having a softening temperature substantially lower than that at which the base film would be affected, said transparent thermoplastic film having a surface which is non-tacky at room temperature, pressing the side of the laminated film with the thermoplastic lamination thereon into contact with the paper having the picture or printed matter thereon, heating the film to a temperature at which the thermoplastic surface of the lamination is softened, maintaining the heat and pressure until the picture or printed matter adheres to the film, cooling the film until the thermoplastic surface is no longer softened and removing the paper from the film, leaving an impression of the picture or printed matter on the surface of the thermoplastic lamination, the cooled film and thermoplastic layer constituting a stable transparency which may be exhibited in a projector or otherwise.

2. A process as claimed in claim 1 having as a final step, coating the face of the film having the impression thereon with a thin transparent coating having a smooth outer surface so as to enhance the transparency of the completed article.

3. A process as claimed in claim 1 including the steps of placing the film and paper between two thin optically smooth metal plates, clamping said plates in a press and applying the heat to the plates while so clamped.

References Cited in the file of this patent

UNITED STATES PATENTS

| | | |
|---|---|---|
| 1,406,538 | Choate | Feb. 14, 1922 |
| 1,777,309 | Hopkinson | Oct. 7, 1930 |
| 1,931,147 | Hampel | Oct. 17, 1933 |
| 2,611,720 | Van Dyck | Sept. 23, 1952 |
| 2,708,647 | Walsh | May 17, 1955 |
| 2,996,104 | Munro | Aug. 15, 1961 |

FOREIGN PATENTS

| | | |
|---|---|---|
| 551,440 | Great Britain | Feb. 23, 1943 |
| 774,527 | Great Britain | May 8, 1957 |